(12) United States Patent
Jikuya et al.

(10) Patent No.: US 8,540,379 B2
(45) Date of Patent: Sep. 24, 2013

(54) IMAGE DISPLAY DEVICE AND INFORMATION PROCESSING APPARATUS INCLUDING THE SAME

(75) Inventors: Nobuo Jikuya, Kumamoto (JP); Hitoshi Fujimoto, Fukuoka (JP); Ryousuke Araki, Tokyo (JP)

(73) Assignee: Panasonic Corporation, Osaka (JP)

(*) Notice: Subject to any disclaimer, the term of this patent is extended or adjusted under 35 U.S.C. 154(b) by 270 days.

(21) Appl. No.: 13/037,645

(22) Filed: Mar. 1, 2011

(65) Prior Publication Data

US 2012/0092567 A1 Apr. 19, 2012

(30) Foreign Application Priority Data

Oct. 15, 2010 (JP) ................................ 2010-232210
Oct. 15, 2010 (JP) ................................ 2010-232211

(51) Int. Cl.
*G03B 21/14* (2006.01)
(52) U.S. Cl.
USPC ............... 353/119; 353/46; 353/79; 353/98; 353/99; 353/122; 348/208.4
(58) Field of Classification Search
USPC ............ 353/30, 31, 69–74, 79, 98–99, 119, 353/122; 349/5, 7–9, 10; 362/227, 231, 362/253, 259; 348/207.99, 208.4
See application file for complete search history.

(56) References Cited

U.S. PATENT DOCUMENTS

| | | | |
|---|---|---|---|
| 6,873,356 B1 | 3/2005 | Kanbe et al. | |
| 7,044,605 B2* | 5/2006 | Olson et al. | 353/30 |
| 7,862,185 B2* | 1/2011 | Noba | 353/119 |
| 7,891,826 B2* | 2/2011 | Fujinawa et al. | 353/119 |
| 8,382,296 B2* | 2/2013 | Itoh et al. | 353/119 |
| 8,439,508 B2* | 5/2013 | Matsuo et al. | 353/119 |
| 2005/0088621 A1* | 4/2005 | Ikeuchi | 353/15 |
| 2007/0177115 A1* | 8/2007 | Yin et al. | 353/122 |
| 2007/0263176 A1* | 11/2007 | Nozaki et al. | 353/69 |
| 2008/0074565 A1* | 3/2008 | Sagawa | 349/7 |
| 2008/0136973 A1 | 6/2008 | Park | |

(Continued)

FOREIGN PATENT DOCUMENTS

| | | |
|---|---|---|
| DE | 202008014899 U1 | 2/2009 |
| DE | 202008013769 U1 | 4/2009 |
| EP | 0683596 A2 | 11/1995 |
| EP | 2426925 A2 | 3/2012 |
| JP | 2007-316393 | 12/2007 |

OTHER PUBLICATIONS

U.S. Appl. No. 13/036,224 to Nobuo Jikuya et al., filed Feb. 28, 2011.

*Primary Examiner* — Georgia Y Epps
*Assistant Examiner* — Sultan Chowdhury
(74) *Attorney, Agent, or Firm* — Greenblum & Bernstein, P.L.C.

(57) ABSTRACT

An image display device built into electronic apparatuses, the device including a laser beam source unit emitting laser beams of various colors; a light modulation element modulating the laser beams emitted from the laser beam source unit, based on video signals; a projecting optical system projecting the modulated laser beams formed by the light modulation element on a screen; a control portion controlling the laser beam source unit and the light modulation element; and a movable body provided to be drawn out of and inserted into the case of electronic apparatuses. The movable body includes at least a first unit having the projecting optical system and a second unit rotatably supporting the first unit through a hinge portion. The hinge portion is featured by rotating the first unit.

6 Claims, 11 Drawing Sheets

(56) References Cited

U.S. PATENT DOCUMENTS

| | | | |
|---|---|---|---|
| 2008/0212041 A1* | 9/2008 | Koizumi et al. | 353/122 |
| 2009/0161031 A1 | 6/2009 | Kaise | |
| 2009/0256052 A1 | 10/2009 | Hsu et al. | |
| 2009/0257182 A1 | 10/2009 | Yang | |
| 2009/0257183 A1 | 10/2009 | Yang | |
| 2010/0026818 A1* | 2/2010 | Yang et al. | 348/207.99 |
| 2011/0164368 A1 | 7/2011 | Leng | |
| 2012/0057136 A1 | 3/2012 | Enomoto et al. | |

\* cited by examiner

IMAGE DISPLAY DEVICE AND INFORMATION PROCESSING APPARATUS INCLUDING THE SAME

BACKGROUND

1. Field of the Invention

The present invention relates to an image display device using a semiconductor laser for a light source, and particularly relates to an image display device built into various electronic apparatuses.

2. Description of the Related Art

In recent years, a technique of using a semiconductor laser for a light source of an image display device has drawn attention. Compared to a mercury lamp that has been widely used in the image display device in the related art, the semiconductor laser has a variety of advantages such as the points that the laser shows an excellent color reproducibility, can be lit instantly, has a long life, can reduce power consumption through high efficiency, and can be easily miniaturized, for example.

These advantages of the image display device using the semiconductor laser are achieved significantly when the image display device is built into portable electronic apparatuses. For example, a technique of installing the image display device using the semiconductor laser into a mobile phone terminal is known (JP 2007-316393 A). In this way, when the image display device is built into portable electronic apparatuses, it is possible to display images on a screen while enlarging the images as necessary, and convenience can be improved accordingly.

The image display device using the semiconductor laser for the light source can also improve the convenience even when the apparatus is built into a portable information processing apparatus (commonly known as a laptop). In this case, the image display device is accommodated inside a case of a main body portion where a keyboard is disposed.

Incidentally, the case of the portable information processing apparatus is formed to be flat for the purpose of improving portability. Therefore, it causes problems in that a portion of the image displayed on the screen is missing or the image is slanted.

For instance, the case of the portable information processing apparatus is formed to be flat for the purpose of improving portability. Accordingly, when the portable information processing apparatus is placed on a desk, the image display device comes close to the surface where the image display device is placed, and thus a laser beam emitted from the image display device is blocked by the surface. In this state, the bottom portion of the image displayed on the screen is missing, whereby a problem that the image cannot be displayed properly occurs.

The image display device is provided such that the accommodation space thereof is opened in the lateral surface of the case of the portable information processing apparatus and the emission window of the image display device is placed in the lateral surface of the case of the portable information processing apparatus. Herein, the case of the portable information processing apparatus accommodates a frame supporting the keyboard and an internal control board. Since the frame is disposed along the upper surface of the case where the keyboard is arranged, the accommodation space for the image display device is also made to be formed along the upper surface of the case. In addition, in some of the portable information processing apparatuses, the upper surface of the case where the keyboard is arranged is made to be slanted so that the side that is near to a user is lowered when the portable information processing apparatus is placed on the desk. In this configuration, the accommodation space for the image display device is also formed to be slanted along the upper surface of the case. However, since the case of the portable information processing apparatus is formed to be flat to improve the portability, there is not enough room for the accommodation space for the image display device. Also, since it is not easy to provide the image display device to be parallel to the desk surface where the portable information processing apparatus is placed, it is inevitable that the image display device is provided to be slanted with respect to the surface. As a result, the image is displayed on the screen while being slanted, so that a problem occurs in that the image cannot be displayed properly on the screen.

SUMMARY

The object of the invention is to resolve the above problems in the conventional technique. A main object of the invention is to provide an image display device and a portable information processing apparatus which can prevent the problems such as slanting or missing images in a display on a screen.

In order to achieve the object, the invention provides an image display device built into electronic apparatuses, the device including a laser beam source unit emitting laser beams of various colors; a light modulation element modulating the laser beams emitted from the laser beam source unit, based on video signals; a projecting optical system projecting the modulated laser beams formed by the light modulation element on a screen; a control portion controlling the laser beam source unit and the light modulation element; and a movable body provided to be drawn out of and inserted into the case of electronic apparatuses. The movable body includes at least a first unit having the projecting optical system and a second unit rotatably supporting the first unit through a hinge portion. The hinge portion is featured by rotating the first unit.

Another object of the invention is to avoid a state where the bottom portion of the image is missing on the screen since the laser beam is blocked by a desk surface, when the electronic apparatus including the built-in image display device is placed on the desk. In order to achieve the object, the hinge portion of the invention may rotate the first unit in a direction where a projection angle of the laser beam to the screen changes vertically.

A further object of the invention is to avoid a state where the image is displayed on the screen while being slanted, even in a case where the image display device is provided in the information processing apparatus while being slanted to the desk surface when the electronic apparatus including the built-in image display device is placed on the desk. In order to achieve the object, the hinge portion of the invention may rotate the first unit in a direction where the slanting of the image on the screen is corrected.

An even further object of the invention is not to provide the control portion at the first unit; accordingly, since the first unit can be lightened, a load applied to the hinge portion is reduced. In this manner, production costs are reduced because the production of the hinge portion with a low strength is possible.

A still further object of the invention is to improve the convenience of the portable information processing apparatus. The case of the portable information processing apparatus is formed to be flat to improve the portability. Accordingly, a gap between the desk surface where the image display device is placed and the image display device is narrow, and the laser beam emitted from the image display device is blocked by device-mounted surface in many cases. Hence, the invention is particularly effective. Herein, an optical disc apparatus refers to an apparatus performing at least one of the recording or reproducing of information in optical discs such as a blue-ray disc, a DVD, and a CD.

An additional object of the invention is to avoid a state where the bottom portion of the image is missing on the screen since the laser beam is blocked by the device-mounted surface, by making it possible to vertically change the projection angle of the laser beam to the screen, when the electronic apparatus including the built-in image display device is placed on the desk.

Another object of the invention is to prevent damage to a interconnection cable, by not applying a load to the interconnection cable when a connecting member rotates around a second rotation axis.

DETAILED DESCRIPTION

Herein below, embodiments of the invention will be described with reference with drawings.

Figure 1:
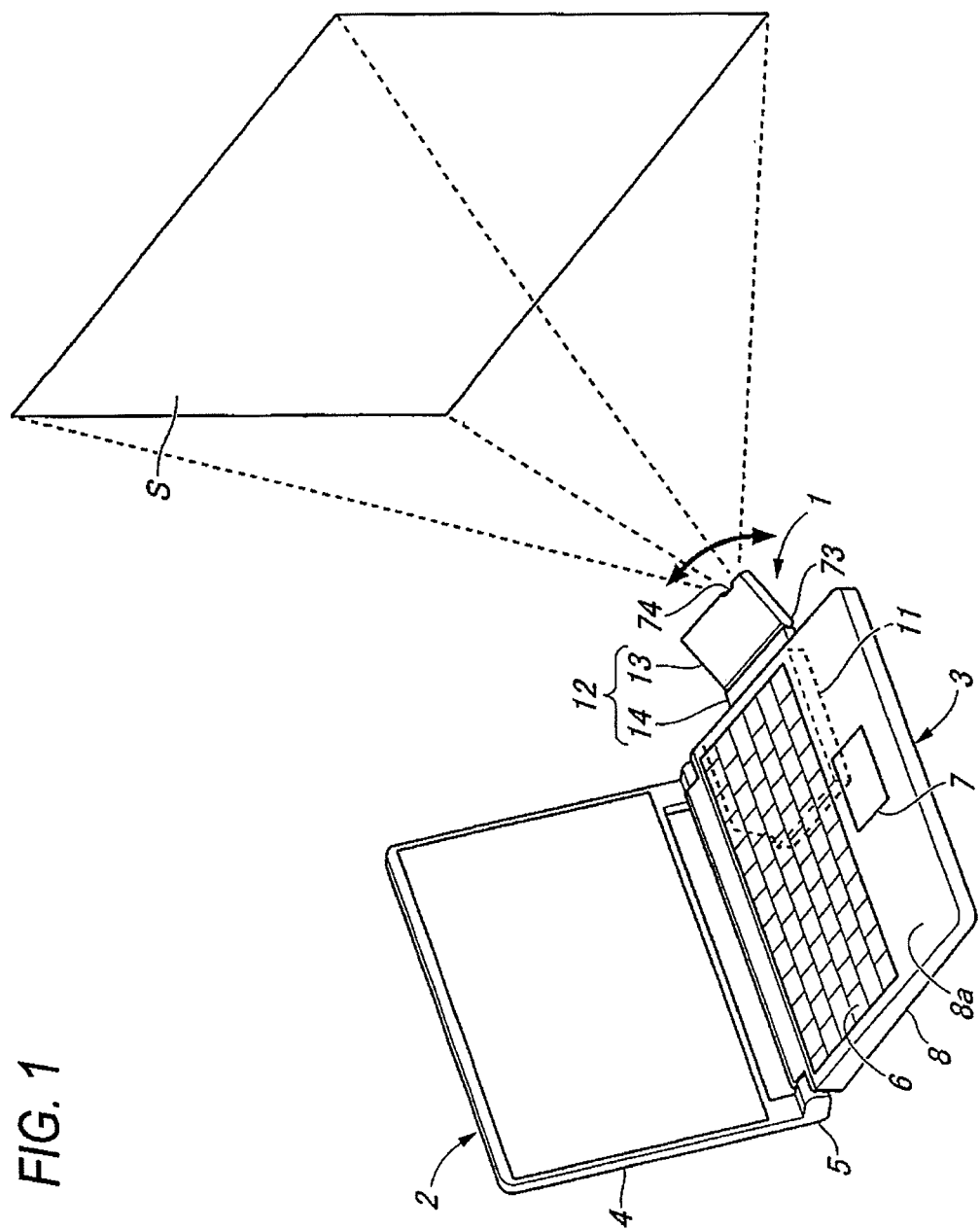
FIG. 1 is a perspective view showing an example in which an image display device 1 is built into a portable information processing apparatus 2 according to the invention.

FIG. 1 is a perspective view showing an example in which an image display device 1 is built into a portable information processing apparatus 2 according to the invention. The portable information processing apparatus (electronic apparatus) 2 includes a main body portion 3 having, for example, a built-in control board (not shown) where a CPU and a memory are mounted and a display portion 4 including a liquid crystal panel. The main body portion 3 and the display portion 4 are connected to each other through a hinge portion 5, and are superimposed on each other when the portable information processing apparatus 2 is folded, thereby improving the portability.

An upper surface 8a of a case 8 of the main body portion 3 is provided with a keyboard 6 and a touch pad 7. In the reverse side of the keyboard 6 in the case 8 of the main body portion 3, an accommodation space where a peripheral such as an optical disc apparatus is replaceably accommodated, a so-called drive bay is formed, and the image display device 1 is provided in the drive bay.

The image display device 1 includes a case 11 and a movable body 12 provided to be drawn out of and inserted into the case 11. The movable body 12 includes the optical engine unit (a first unit) 13 accommodating optical parts for projecting the laser beam on a screen S, and a control unit (a second unit) 14 accommodating, for example, a board for controlling the optical parts in the optical engine unit 13.

Figure 2:
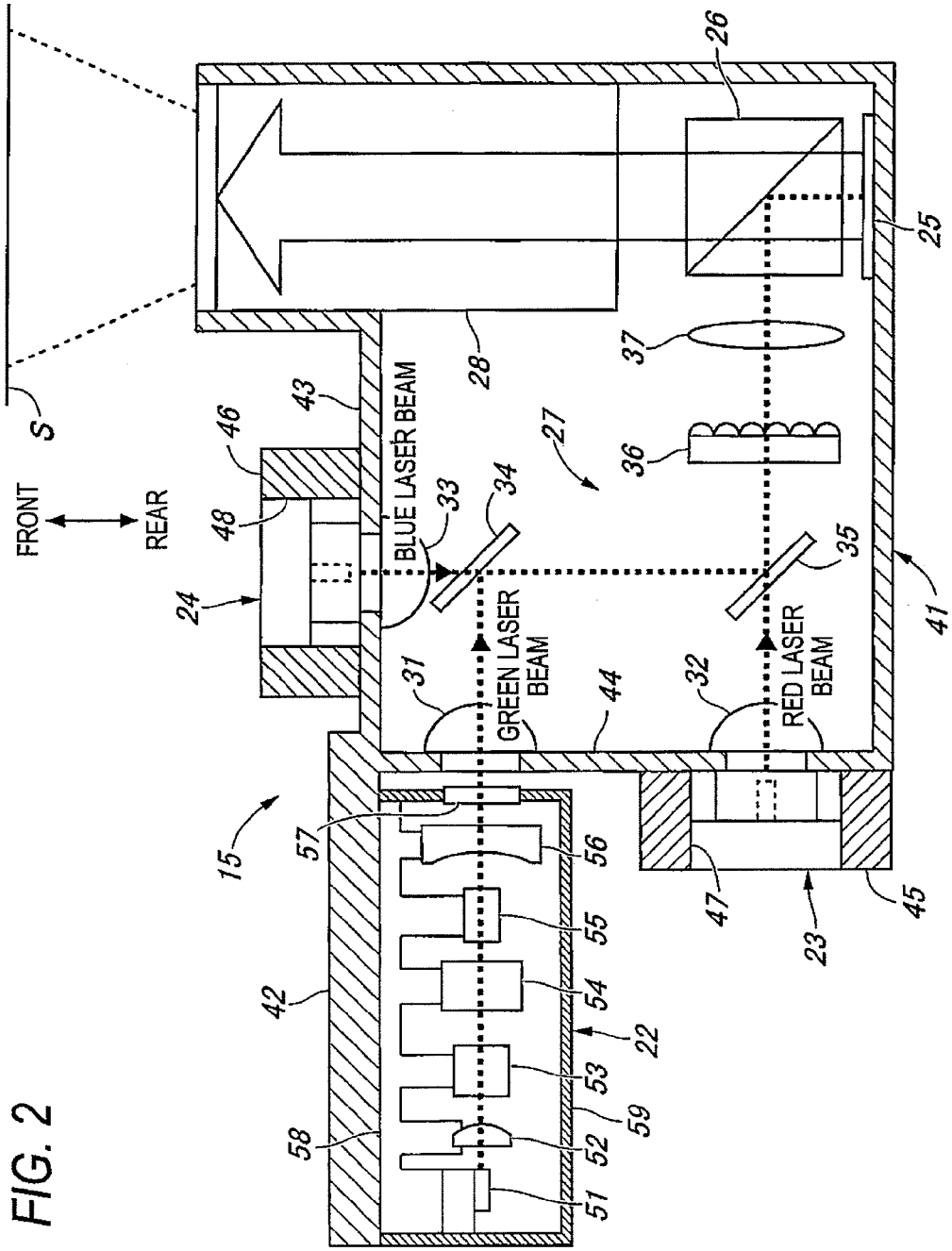
FIG. 2 is a schematic configuration view of an optical engine portion 15 built in an optical engine unit 13.

FIG. 2 is a schematic configuration view of an optical engine portion 15 built in an optical engine unit 13. The optical engine portion 15 includes the green laser beam source unit 22 outputting a green laser beam, a red laser beam source unit 23 outputting a red laser beam, a blue laser beam source unit 24 outputting a blue laser beam, a reflective liquid crystal type of light modulation element 25 modulating the laser beams from respective laser beam source units 22 to 24 according to video signals, a polarization beam splitter 26 reflecting the laser beams from the respective laser beam source units 22 to 24 to irradiate the light modulation element 25 with the laser beams and transmitting the modulated laser beams emitted from the light modulation element 25, a relay optical system 27 guiding the laser beams emitted from the respective laser beam source units 22 to 24 to the polarization beam splitter 26, and a projection optical system 28 projecting the modulated laser beams transmitted through the polarization beam splitter 26 on the screen S.

The optical engine portion 15 displays color images in a so-called field sequential method, wherein the laser beams with respective colors from the respective laser beam source units 22 to 24 are sequentially output in a time-division manner, and images created by the laser beams with respective colors are recognized as color images due to the visual afterimage effect.

The relay optical system 27 includes collimator lenses 31 to 33 converting the laser beams with respective colors emitted from the respective laser beam source units 22 to 24 to parallel beams, a first and a second dichroic mirrors 34 and 35 guiding the laser beams with respective colors having passed through the collimator lenses 31 to 33 in a required direction, a diffusion plate 36 diffusing the laser beams guided by the dichroic mirrors 34 and 35, and a field lens 37 converting the laser beams having passed through the diffusion plate 36 to converging lasers.

Provided that the side from which the laser beam is emitted from the projection optical system 28 to the screen S is a front side, the blue laser beam is emitted from the blue laser beam source unit 24 to the rear side. In order that the optical axis of the green laser beam and the optical axis of the red laser beam are made to be orthogonal to the optical axis of the blue laser beam, the green laser beam and the red laser beam are emitted from the green laser beam source unit 22 and the red laser beam source unit 23 respectively. These blue, red, and green laser beams are guided to the same light pate by the two dichroic mirrors 34, and 35. That is, the blue and the green laser beams are guided to the same light path by the first dichroic mirror 34, and the blue, green, and the red laser beams are guided to the same light path by the second dichroic mirror 35.

On the surfaces of the first and the second dichroic mirrors 34 and 35, films are formed to transmit and reflect the laser beam of a predetermined wavelength. The first dichroic mirror 34 transmits the blue laser beam and reflects the green laser beam, and the second dichroic mirror 35 transmits the red laser beam and reflects the blue and the green laser beams.

Each of these optical members is supported in a case 41. The case 41 functions as a radiator radiating the heat that the respective laser beam source units 22 to 24 generate, and is formed with materials exhibiting high thermal conductivity such as aluminum or copper.

The green laser beam source unit 22 is provided in a mounting portion 42 which is formed in the case 41 while protruding laterally. The mounting portion 42 is provided in a state where it protrudes in a direction orthogonal to a side wall portion 44, from a corner at which a front wall portion 43 and the side wall portion 44 placed respectively in the front and the rear of the accommodation space in the relay optical system 27 intersect. The red laser beam source unit 23 is provided on the outer surface of the side wall portion 44 while being held in a holder 45. The blue laser beam source unit 24 is provided on the outer surface of the front wall portion 43 while being held in a holder 46.

The red laser beam source unit 23 and the blue laser beam source unit 24 are constituted with a so-called CAN package, wherein laser chips outputting the laser beams are disposed so that the optical axis is placed on the central axis of a can-like exterior portion while the chips are supported in the system. The laser beams are emitted through a glass window provided in the opening of the exterior portion. The red laser beam source unit 23 and the blue laser beam source unit 24 are fixed with respect to the holders 45 and 46 by being pressed into mounting holes 47 and 48 opened in the holders 45 and 46. The heat generated from the chips of the blue laser beam source unit 24 and the red laser beam source unit 23 is radiated by being transferred to the case 41 through the holes 45 and 46, and each of the holders 45 and 46 is formed with materials exhibiting high thermal conductivity such as aluminum and copper.

The green laser beam source unit 22 includes a semiconductor laser 51 outputting excitation laser beams, an FAC (Fast-Axis Collimator) lens 52 and a rod lens 52 which are condensing lenses condensing the excitation laser beam output from the semiconductor laser 51, a solid-state laser element 54 excited by the excitation laser beam and outputting a basic laser beam (infrared laser beam), a wavelength converting element 55 converting the wavelength of the basic laser beam and outputting a half-wavelength laser beam (green laser beam), a concave mirror 56 constituting a resonator together with the solid-state laser element 54, a glass cover 57 preventing the leakage of the excitation laser beam and the basic wavelength laser beam, a base 58 supporting each part, and a cover 59 covering each part.

The green laser beam source unit 22 is fixed by providing the base 58 in the mounting portion 42 of the case 41, and a gap with a required width (0.5 mm or less, for example) is formed between the green laser beam source unit 22 and the side wall portion 44 of the case 41. In this configuration, the heat of the green laser beam source unit 22 is not easily transferred to the red laser beam source unit 23, so the temperature rising of the red laser beam source unit 23 is controlled. Therefore, it is possible to stably operate the red laser beam source unit 23 having a poor temperature characteristic. Also, in order to secure a required margin (about 0.3 mm, for example) of the optical axis adjustment for the red laser beam source unit 23, a gap having a required width (0.3 mm or more, for example) is formed between the green laser beam source unit 22 and the red laser beam source unit 23.

Figure 3:
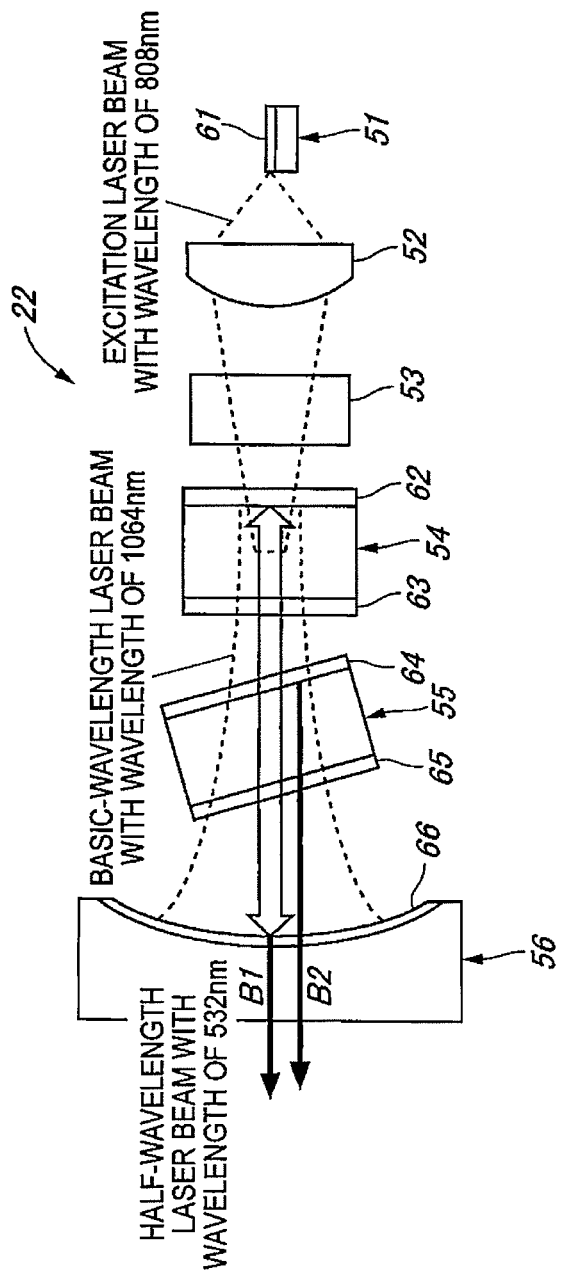
FIG. 3 is a schematic view showing the state of laser beams in a green laser beam source unit 22.

FIG. 3 is a schematic view-showing the state of laser beams in a green laser beam source unit 22. A laser chip 61 of the semiconductor 51 outputs the excitation laser beam with a wavelength of 808 nm. The FAC lens 52 reduces the broadening of the first axis (a direction which is orthogonal to the optical axis direction and extends along the surface of the paper where the figure is drawn). The rod lens 53 reduces the broadening of a slow axis (a direction orthogonal to the surface of the paper where the figure is drawn) of the laser beam.

The solid-state laser element 54 is a so-called solid-state laser crystal, excited by the excitation laser beam with a wavelength of 808 nm having passed through the rod lens 53, and outputs a basic wavelength laser beam (infrared laser beam) with a wavelength of 1064 nm. The solid-state laser element 54 is obtained by doping an optically activated inorganic material (crystal) including Y(yttrium)VO4(vanadate) with Nd (neodymium). More specifically, the solid-state laser element 54 is obtained by substituting the Y of the YVO4 as a base material with Nd+3 which is an element producing fluorescence and performing doping.

In the solid-state laser element 54, at the side facing the rod lens 53, a film 62 having a function of preventing the reflection of the excitation laser with a wavelength of 808 nm and a function of highly reflecting the basic wavelength laser beam with a wavelength of 1064 nm and the half-wavelength laser beam with a wavelength of 532 nm is formed. In the solid-state laser element 54, at the side facing the wavelength converting element 55, a film 63 having a function of preventing the reflection of the basic wavelength laser beam with a wavelength of 1064 nm and the half-wavelength laser beam with a wavelength of 532 nm is formed.

The wavelength converting element 55 is a so-called SHG (Second Harmonics Generation) element, and converts the wavelength of the basic wavelength laser beam (infrared laser beam) with a wave length of 1064 nm output from the solid-state laser element 54, thereby generating the half-wavelength laser beam (green laser beam) with a wavelength of 532 nm.

In the wavelength converting element 55, at the side facing the solid-state laser element 54, a film 64 having a function of preventing the reflection of the basic wavelength laser beam with a wavelength of 1064 nm and a function of highly reflecting the half-wavelength laser beam with a wavelength of 532 nm is formed. In the wavelength converting element 55, at the side facing the concave mirror, a film 65 having a function of preventing the reflection of the basic wavelength laser beam with a wavelength of 1064 nm and the half-wavelength laser beam with a wavelength of 532 nm is formed.

The concave mirror 56 includes a concave surface at the side facing the wavelength converting element 55. In the concave surface, a film 66 having a function of highly reflecting the basic wavelength laser beam with a wavelength of 1064 nm and a function of preventing the reflection of the half-wavelength laser beam with a wavelength of 532 nm is formed. In this configuration, the basic wavelength laser beam with a wavelength of 1064 nm resonates and is amplified between the film 62 of the solid-state laser element 54 and the film 66 of the concave mirror 56.

In the wavelength converting element 55, a part of the basic wavelength laser beam with a wavelength of 1064 nm coming from the solid-state laser element 54 is converted into the half-wavelength laser beam with a wavelength of 532 nm. Also, the basic wavelength laser beam with a wavelength of 1064 nm which has passed through the wavelength converting element 55 without being converted is reflected on the concave mirror 56, comes into the wavelength converting element 55 again, and is converted into the half-wavelength laser beam with a wavelength of 532 nm. The half-wavelength laser beam with a wavelength of 532 nm is reflected on the film 64 of the wavelength converting element 55 and is emitted from the wavelength converting element 55.

Here, in a state where a beam B1 of the laser beam, which comes into the wavelength converting element 55 from the solid-state laser element 54, is subjected to the wavelength conversion by the wavelength converting element 55, and is emitted from the wavelength converting element 55, and a beam B2 of the laser beam, which is reflected first by the concave mirror 56, comes into the wavelength converting element 55, is reflected by the film 64, and is emitted from the wavelength converting element 55 are superimposed on each other, the half-wavelength laser beam with a wavelength of 532 nm and the basic wavelength laser beam with a wavelength of 1064 nm interfere with each other, and the output decreases accordingly.

Therefore, in this case, by slanting the wavelength converting element 55 with respect to the optical axis direction to achieve a refraction action on an incidence surface and an emission surface, it is possible that the beam B1 and the beam B2 of the laser beam are not superimposed on each other. Accordingly, the half-wavelength laser beam with a wavelength of 532 nm and the basic wavelength laser beam with a wavelength of 1064 nm are prevented from interfering with each other, whereby the decrease in output can be avoided.

On the glass cover 57 shown in FIG. 2, in order to prevent the excitation laser beam with a wavelength of 808 nm and the basic wavelength laser beam with a wavelength of 1064 nm from leaking to the outside, a film that does not transmit those laser beams is formed.

Figure 4:
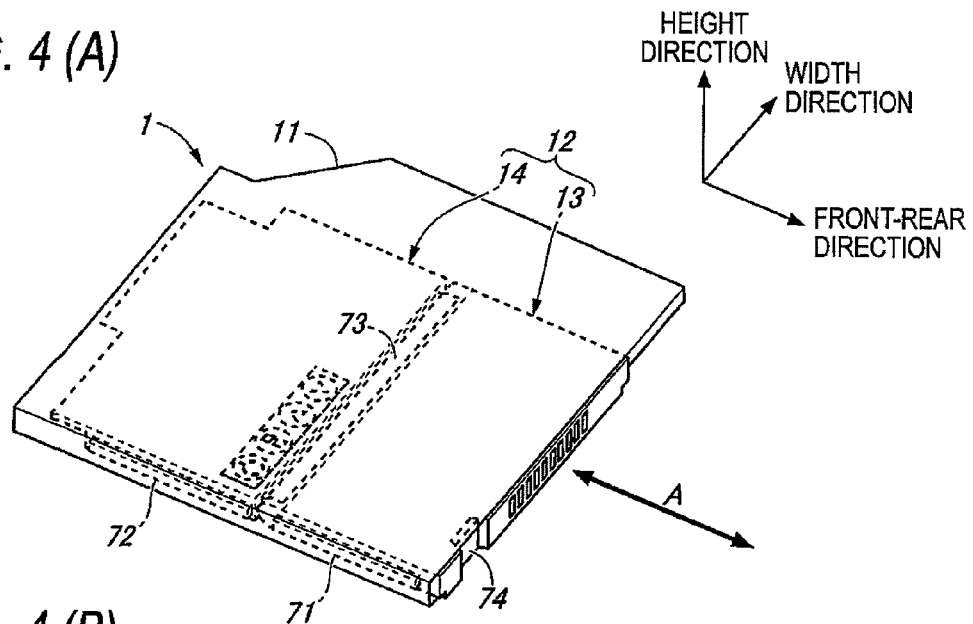
FIG. 4(A) is a first perspective view showing the image display device 1.
FIG. 4(B) is a second perspective view showing the image display device 1.
Figure 4:
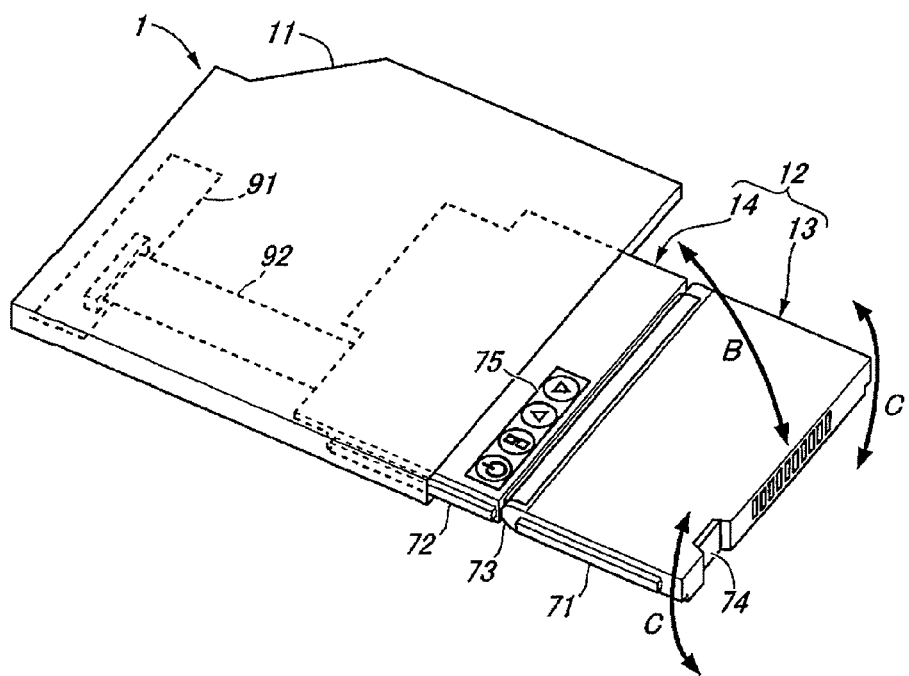

FIG. 4 is a perspective view showing the image display device 1. FIG. 4(A) shows a state where the movable body 12 is stored in the case 11, and FIG. 4(B) shows a usage state where the movable body 12 is drawn out of the case 11.

Each case of the optical engine unit 13 and the control unit 14 constituting the movable body 12 is formed into a flat box-like shape in which the dimension of height direction is short. At the edges of the both sides of each case of the optical engine unit 13 and the control unit 14, sliders 71 and 72 sliding along the guide rail (not shown) provided in the case 11 are installed. As shown by an arrow A, by an operation of inserting and drawing performed by a user, the movable body 12 is drawn out of and inserted into the case 11.

As the end portion of the side, the side opposite to the hinge portion 73, of the optical engine unit 13, an emission window 74 is provided. From the emission window 74, the laser beam which has passed through the projection optical system 28 (refer to FIG. 2) of the optical engine portion 15 is emitted.

As shown in FIG. 1, the accommodation space for the image display device 1 is opened at the lateral surface of the case 8 of the portable information processing apparatus 2, and is configured so that the movable body 12 is drawn or inserted in the direction approximately orthogonal to the lateral surface of the case 8 of the portable information processing apparatus 2. The case 11 of the image display device 1 is accommodated in the case 8 of the portable information processing apparatus 2. While the image display device 1 is used, a portion of the optical engine unit 13 and the control unit 14 protrudes from the lateral side of the case 8 of the portable information processing apparatus 2. Accordingly, since the lateral surface of the portable information processing apparatus 2 is disposed to face the screen S, it is possible to make the emission window 74 provided in the optical engine unit 13 face the screen S.

As shown in FIG. 4, the optical engine unit 13 and the control unit 14 are connected to each other through the hinge portion 73. In the usage state shown in FIG. 4 (B), while the control unit 14 is supported in the guide rail of the case 11, the optical engine unit 13 is completely drawn out of the case 11. As shown by an arrow B, the optical engine unit 13 can be rotated in a vertical direction, and as shown by an arrow C, the optical engine unit 13 can be rotated in a front-rear direction, that is, around the axis of the direction in which the movable body 12 is drawn or inserted. The configuration of the hinge portion 73 will be described in detail.

On the upper surface of the control unit 14, there is provided an operation portion 75. Operation buttons for various operations such as ON and OFF of power, luminance switching, and trapezoid correction are arranged in the operation portion 75. In addition, there is provided a latch lock (not shown) for holding the movable body 12 in a storage position, in the case 11.

Figure 5:
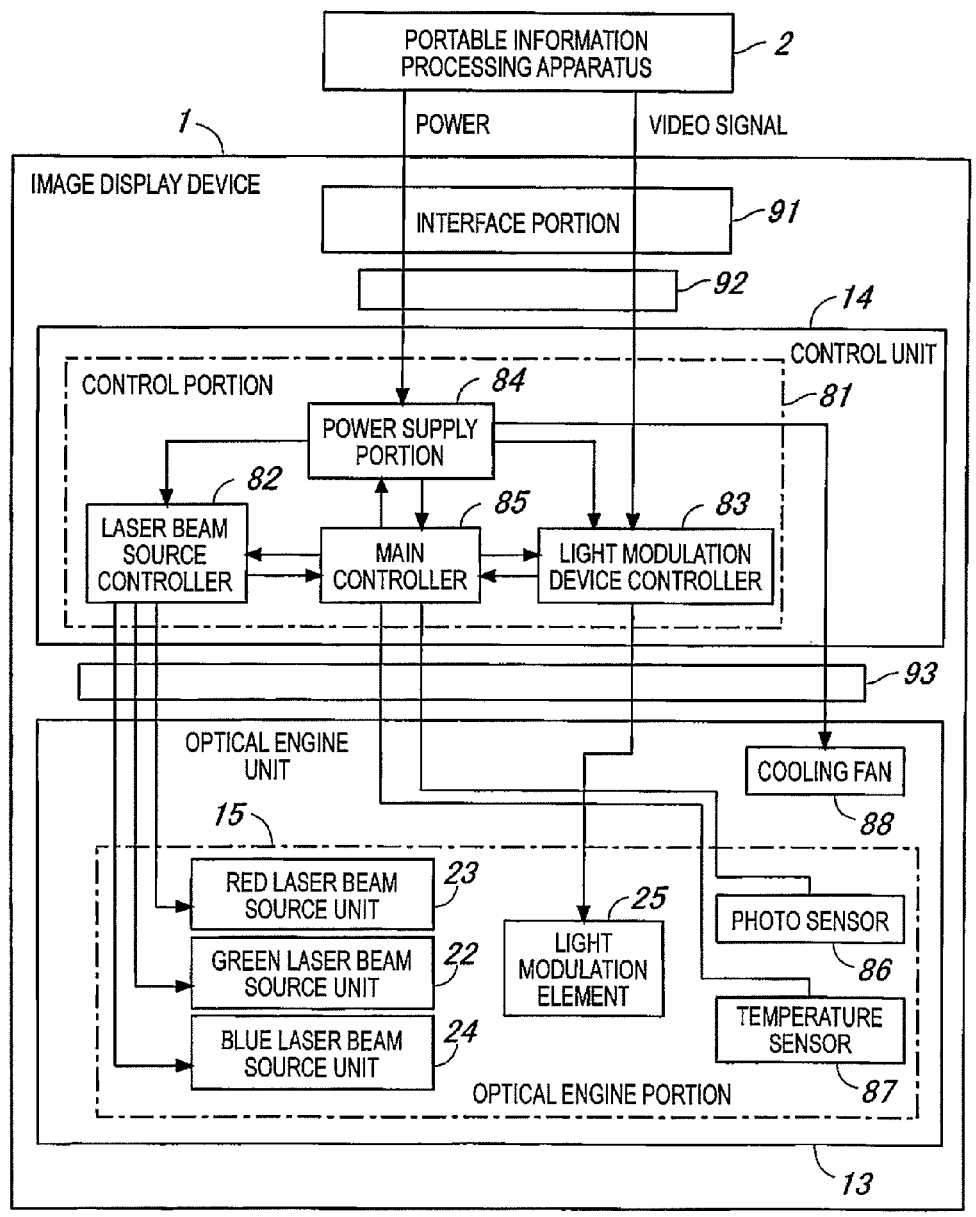
FIG. 5 is a block diagram showing a schematic configuration of the image display device 1.

FIG. 5 is a block diagram showing the schematic configuration of the image display device 1. A control portion 81 of the image display device 1 includes a laser beam source controller 82 controlling the laser beam source units 22 to 24 of the respective colors, a light modulation element controller 83 controlling the light modulation element 25 based on the video signal input from the portable information processing apparatus 2, a power supply portion 84 supplying power supplied from the portable information processing apparatus 2 to the laser beam source controller 82 and the light modulation element controller 83, and a main controller 85 controlling the respective portions overall. The control portion 81 is provided in the control unit 14.

In the optical engine portion 15, in addition to the laser beam source units 22 to 24 of respective colors and the light modulation element 25, there are provided a photo sensor 86 detecting the amount of light coming into the light modulation element 25, and a temperature sensor 87 detecting the temperature near the light modulation element 25. The optical engine portion 15 is provided in the optical engine unit 13, but in the optical engine unit 13, there is provided a cooling fan 88 cooling the optical engine portion 15, in addition to the optical engine portion 15.

In the case 11 (refer to FIG. 4 too) of the image display device 1, there is provided an interface portion 91 to which the power-supply wire for supplying power from the portable information processing apparatus 2 and the signal wire for transmitting the video signals from the portable information processing apparatus 2. The interface portion 91 and the control unit 14 are connected to each other through a interconnection cable 92. The interconnection cable 92 is flexible, and when the movable body 12 is drawn out of and inserted to the case 11, the interconnection cable 92 is transformed by bending to follow the control unit 14.

The control unit 14 and the optical engine unit 13 are connected to each other through the interconnection cable 93. The interconnection cable 93 includes the signal wire for performing the transmission and reception of signals between the respective portions in the control portion 81 and the respective portions in the optical engine portion 15, and the power-supply wire supplying power to the cooling fan 88 or the like. The interconnection cable 93 is also flexible, and when the optical engine unit 13 is rotated with respect to the control unit 14, the interconnection cable 93 is transformed by bending according to the rotation of the optical engine unit 13.

Herein, although the control portion 81 is provided in the control unit 14, a part of the control portion 81, for example, the power supply portion 84 may also be provided in the case 11 together with the interface portion 91.

Figure 6:
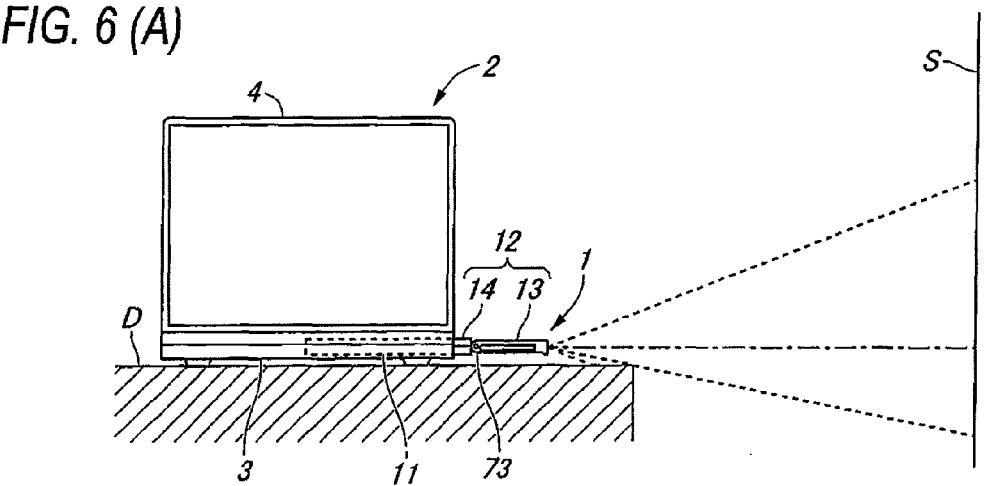
FIG. 6(A) is a first front view showing a state where the portable information processing apparatus 2 is placed on a desk.
FIG. 6B is a second front view showing a state where the portable information processing apparatus 2 is placed on a desk.
Figure 6:
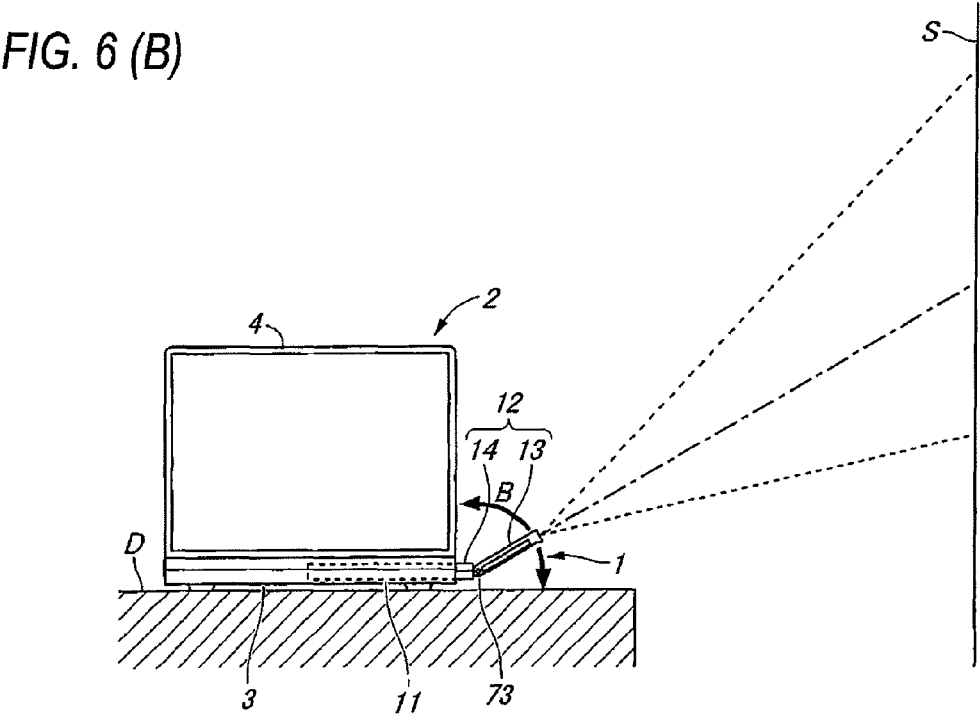

FIG. 6 is a front view showing a state where the portable information processing apparatus 2 is placed on a desk. FIG. 6(A) shows the initial state where the movable body 12 is drawn out, and FIG. 6(B) shows a state where the angle of the optical engine unit 13 is adjusted, respectively.

As shown in FIG. 1, in the portable information processing apparatus 2, the accommodation space for the image display device 1 is formed in the case 8 of the main body portion 3 where the keyboard 6 is disposed. Also, the case 8 of the portable information processing apparatus 2 is formed to be flat to improve the portability. Accordingly, as shown in FIG. 6(A), when the portable information processing apparatus 2 is placed on a desk, the image display device 1 comes close to a device-mounted surface D of the desk. Hence, while the movable body 12 is drawn out, the laser beam emitted from the image display device 1 is blocked by the device-mounted surface D, and thus the bottom portion of the image displayed on the screen S is missing; accordingly, the image cannot be properly projected on the screen S.

Therefore, in the embodiment, as shown in FIG. 6(B), the optical engine unit 13 is supported to the control unit 14 so as to be able to rotate in a vertical direction shown by the arrow B, and the projection angle of the laser beam is made to be adjustable so that the laser beam emitted from the image display device 1 is not blocked by the device-mounted surface D. In this manner, it is possible to avoid the state where the bottom portion of the image displayed on the screen S is missing.

Figure 7:
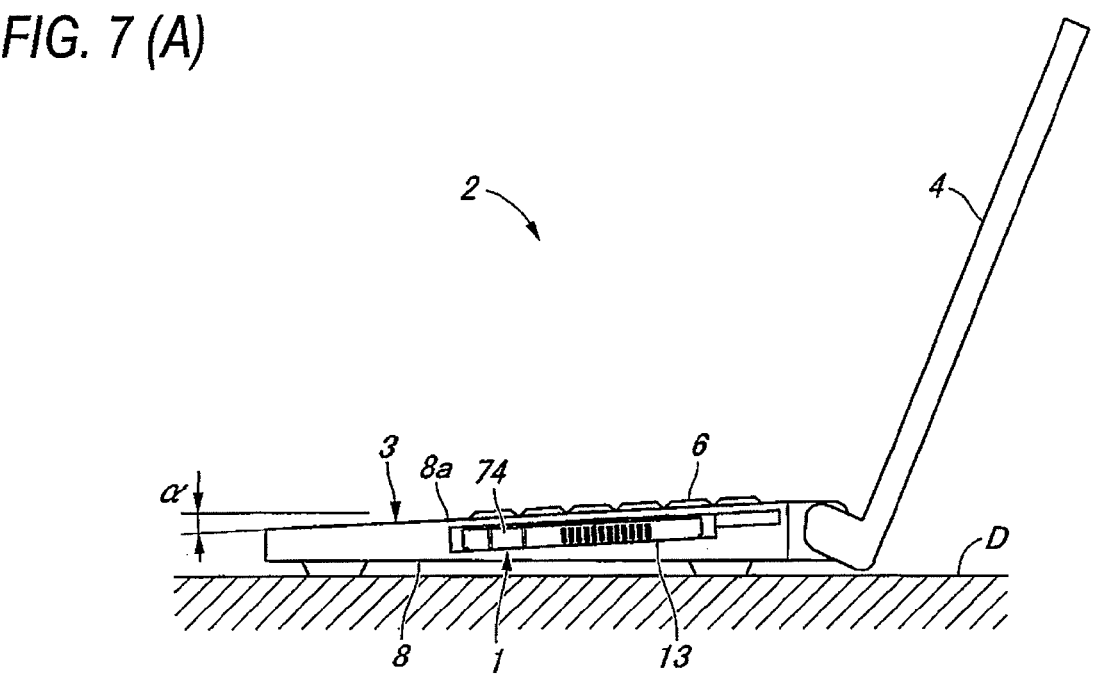
FIG. 7(A) is a first lateral view showing a state where the portable information processing apparatus 2 is placed on a desk.
FIG. 7B is a second lateral view showing a state where the portable information processing apparatus 2 is placed on a desk.
Figure 7:
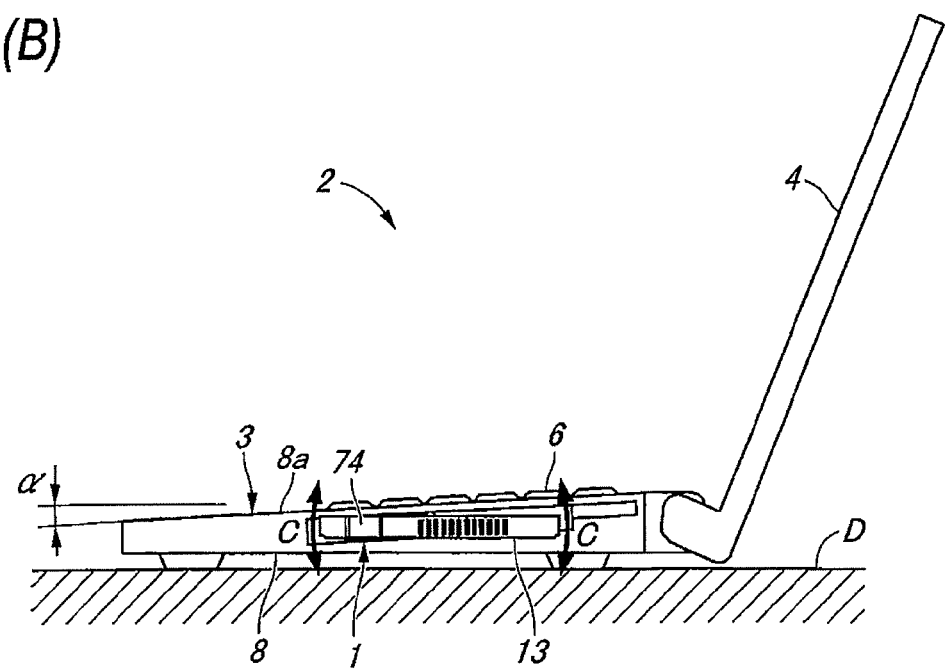

FIG. 7 is a lateral view showing a state where the portable information processing apparatus 2 is placed on a desk. FIG. 7(A) shows the initial state of the optical engine unit 13, and FIG. 7(B) shows the state where the angle of the optical engine unit 13 is adjusted, respectively.

As shown in FIG. 7(A), in the portable information processing apparatus 2, a frame (not shown) supporting the keyboard 6 and an internal control board (not shown) is disposed along the upper surface 8*a* of the case 8, and the accommodation space for the image display device 1 is also made to be formed along the upper surface 8*a* of the case 8. The upper surface 8*a* of the case 8 where the keyboard 6 is arranged is made to be slanted so that the side of upper surface 8*a* that is near to the user is lowered when the portable information processing apparatus 2 is placed on a desk. The accommodation space for the image display device 1 is also formed to be slanted along the upper surface 8*a* of the case 8.

Meanwhile, in the portable information processing apparatus 2, there is not enough room for the accommodation space for the image display device 1 since the case 8 is formed to be flat to improve the portability. Also, since it is not easy to provide the image display device 1 to be parallel to the device-mounted surface D of the desk, the image display device 1 is provided to the portable information processing apparatus 2 while being slanted to the device-mounted surface D. Consequently, the image is displayed on the screen while being slanted, so the image cannot be properly displayed on the screen.

Therefore, in the embodiment, as shown in FIG. 7(B), the optical engine unit 13 is made to rotate in a direction in which the slanting of the image on the screen is corrected, as shown by the arrow C. Also, by making the optical engine unit 13 be in the horizontal direction, the image is displayed on the screen in a proper state where the longitudinal and the transversal direction of the image become the horizontal and the vertical direction respectively.

Figure 8:
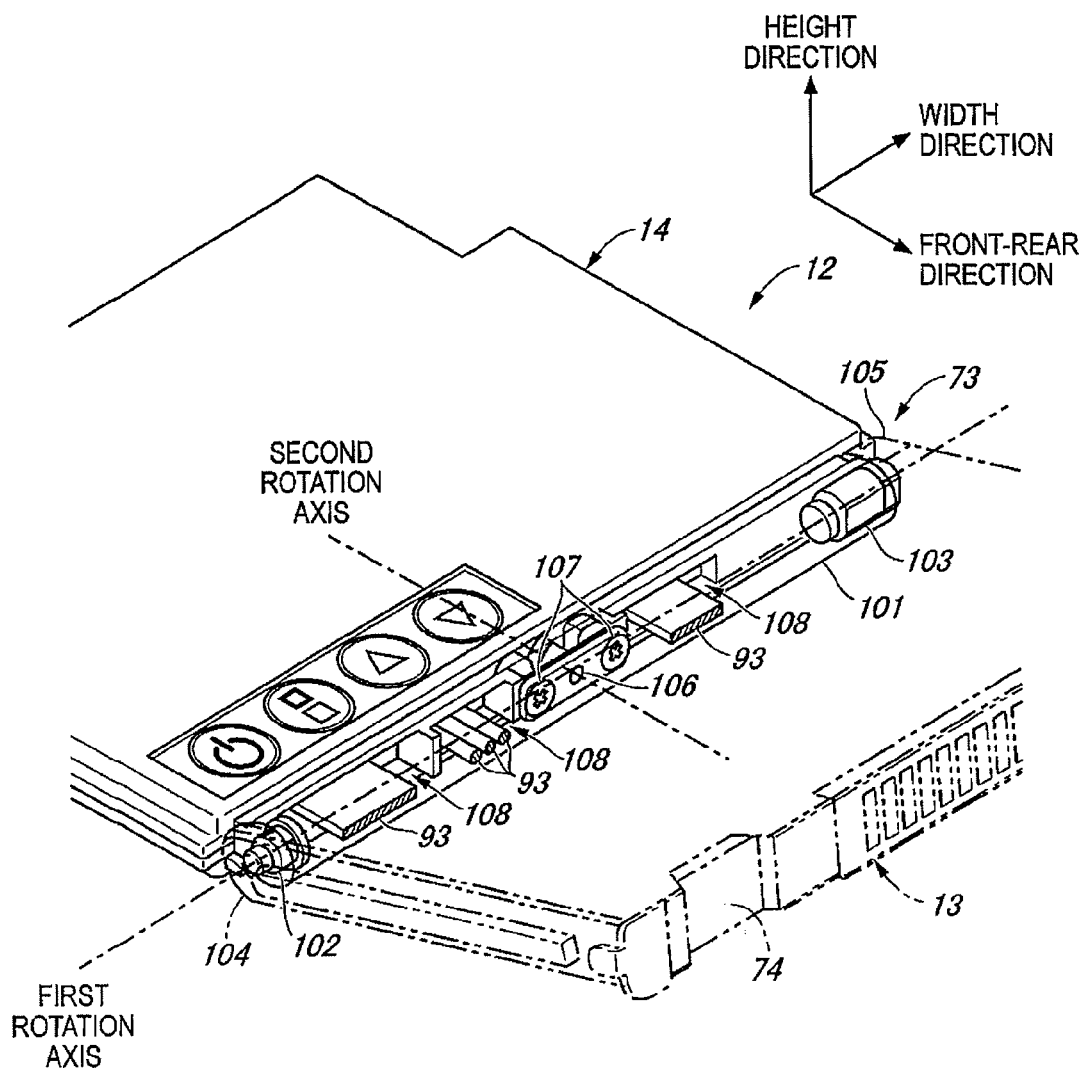
FIG. 8 is a perspective view showing a hinge portion 73 in detail.

FIG. 8 is a perspective view showing the hinge portion 73 in detail. The hinge portion 73 has a two orthogonal axes structure. At both ends in longitudinal direction of the connecting member 101 extending in the width direction of the optical engine unit 13, a pair of the first axial members 102 and 103 having the first rotation axis as the center is connected, and at the central portion in the longitudinal direction of the connecting member 101, the second axial member 106 having the second rotation axis as the center is connected.

A pair of the first axial members 102 and 103 is connected to a pair of the mounting portions 104 and 105 provided in the case of the optical engine unit 13, and supports the case of the optical engine unit 13 to be able to rotate around the first rotation axis. Meanwhile, the second axial member 106 is connected to the central position in the width direction of the case of the control unit 14, and supports the connecting member 101 to be able to rotate around the second rotation axis.

The first rotation axis according to the first axial members 102 and 103 is disposed in the front-rear direction, that is, in the direction orthogonal to the direction in which the movable body 12 is drawn and inserted. This direction is orthogonal to the optical axis of the laser beam emitted from the emission window 74. Meanwhile, the second rotation axis according to the second axial member 106 is disposed in the direction orthogonal to the first rotation axis, and this direction is parallel to the front-rear direction, that is, the direction in which the movable body 12 is drawn or inserted.

Accordingly, by rotating the optical engine unit 13 around the second rotation axis to rotate the image displayed on the screen, it is possible to correct the slanting of the image. Also, by adjusting the first rotation axis to be in the horizontal direction, it is possible to obtain a image that does not slant. After adjusting the first rotation axis to be in the horizontal direction, by rotating the optical engine unit 13 around the first rotation axis, it is possible to adjust the angle of the laser beam emitted from the emission window 74 in the vertical direction, and the image displayed on the screen vertically moves accordingly. In this manner, it is possible to display the image in a favorable state where the slanting or missing image does not occur on the screen, and the image is displayed in a required position. As the image is caused to move vertically, a trapezoid correction for the image is also necessary.

Near the second axial member 106, there is provided a stopper 107 regulating the rotation of the connecting member 101 performed around the second rotation axis with respect to the control unit 14, in a predetermined range. The first axial member 103 out of a pair of the first axial members 102 and 103 includes a free stopper mechanism. By the free stopper mechanism, the optical engine unit 13 is stopped at an arbitrary angle in a predetermined rotation range, and is held as it is.

The rotation of the optical engine unit 13 around the first rotation axis is also regulated by a stopper (not shown). Accordingly, the optical engine unit 13 is made to be able to rotate from the position along the control unit 14 to the position approximately upright to the control unit 14.

In the connecting member 101, there are provided opening portions 108 through which the interconnection cables 93 (refer to FIG. 5 too) as the signal wire and the power-supply wire are inserted, at both sides of the second rotation member 106 which is interposed between the opening portions 108. The interconnection cables 93 are drawn out of the control unit 14 in the direction along the second rotation axis and are inserted into the optical engine unit 13. The interconnection cables 93 include, for example, a flexible print circuit board (FPC) and a lead wire (such as a vinyl-covered wire).

Figure 9:
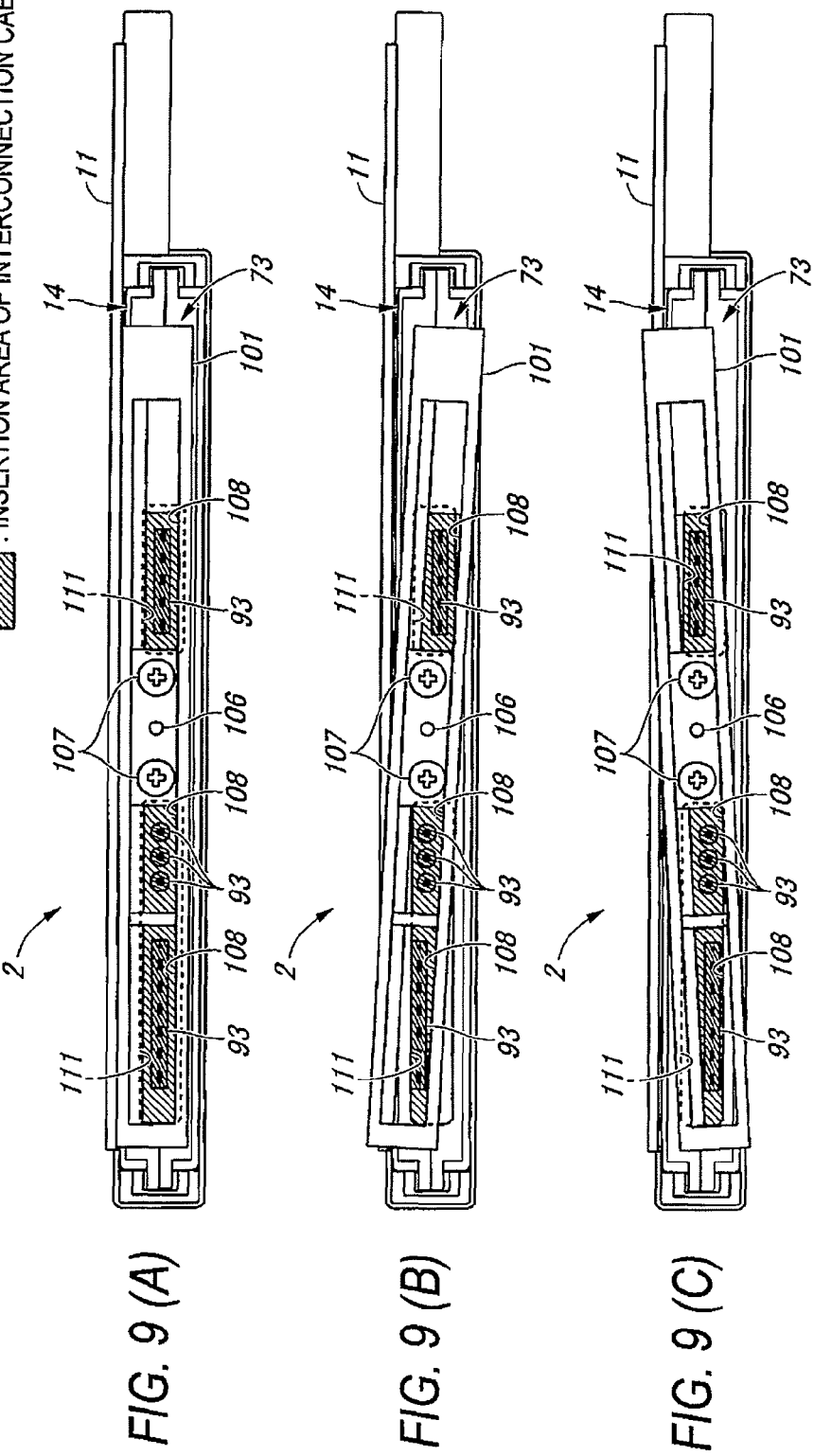
FIG. 9(A) is a first exploded view showing a state of insertion areas of interconnection cables 93 by detaching parts at the side of the optical engine unit 13.
FIG. 9B is a second exploded view showing a state of insertion areas of interconnection cables 93 by detaching parts at the side of the optical engine unit 13.
FIG. 9C is a third exploded view showing a state of insertion areas of interconnection cables 93 by detaching parts at the side of the optical engine unit 13.

FIG. 9 is an exploded view showing a state of the insertion area of the interconnection cables 93 at the time when the connecting member 101 of the hinge portion 73 rotates around the second axial member 106, by detaching parts at the side of the optical engine unit 13. FIG. 9(A) shows the initial state of the connecting member 101, FIG. 9(B) shows a state where the connecting member 101 rotates clockwise, and FIG. 9(C) shows a state where the connecting member rotates counterclockwise, respectively.

In the case of the control unit 14, there are provided opening portions 111 through which the interconnection cables 93 are inserted, at both sides of the second axial member 106 interposed between the opening portions 111. The opening portions 111 of the control unit 14 and the opening portions 108 of the connecting member 101 are superimposed on each other when viewed from the insertion direction of the interconnection cables 93 as shown in the drawing, thereby forming the insertion area of the interconnection cables 93.

The insertion area of the interconnection cables 93 is not influenced by the angle of the connecting member 101 rotating around the second axial member 106, and is made to be secured at all times in the rotation range of the connecting member 101 with a required size in which the interconnection cables 93 are inserted with a required clearance. In this manner, when the connecting member 101 rotates with respect to the control unit 14, the load is not applied to the interconnection cables 93; therefore, the interconnection cables 93 can be prevented from being damaged.

Figure 10:
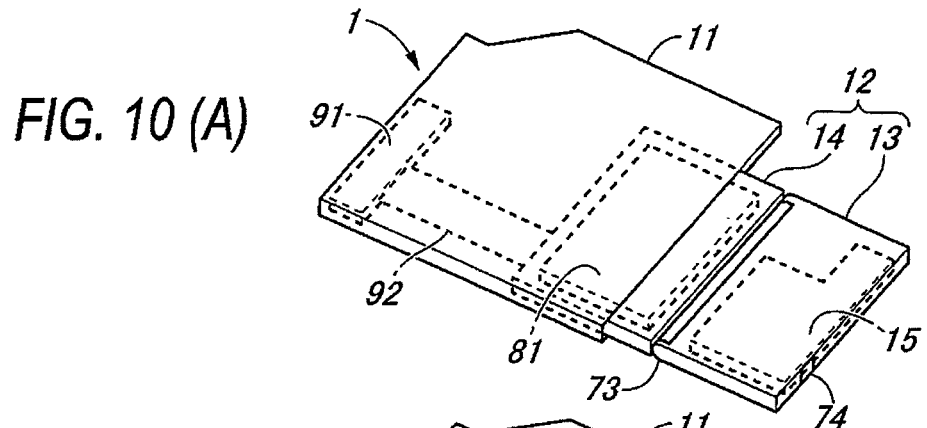
FIG. 10(A) is a first schematic perspective view showing an example of an image processing apparatus.
FIG. 10B is a second schematic perspective view showing the example of the image processing apparatus.
FIG. 10C is a third schematic perspective view showing the example of the image processing apparatus.
FIG. 10D is a fourth schematic perspective view showing the example of the image processing apparatus.
Figure 10:
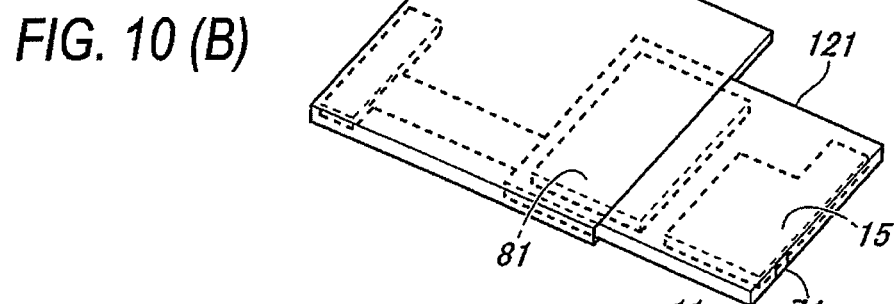
Figure 10:
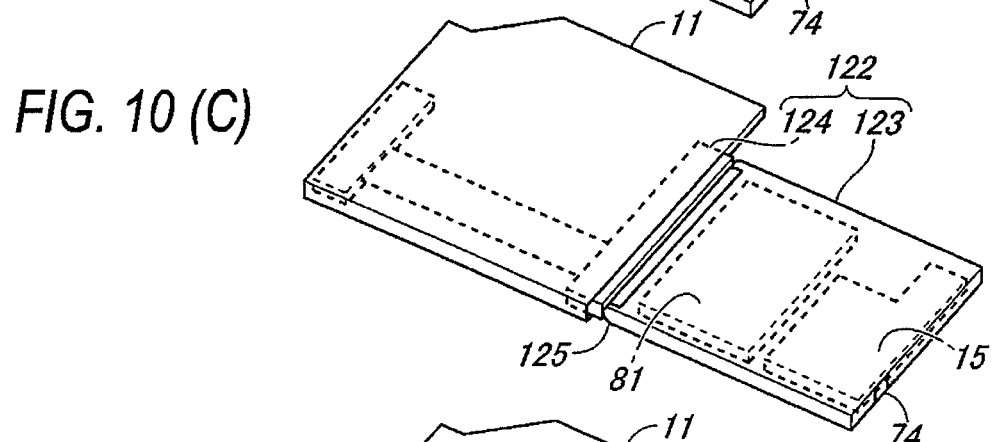
Figure 10:
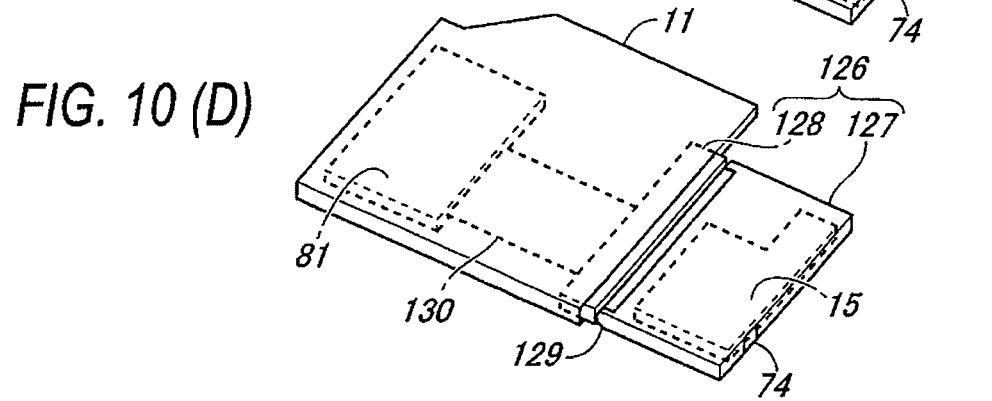

FIG. 10 is a schematic perspective view showing an example of the image display device. FIG. 10(A) shows the image display device 1 according to the embodiment, FIG. 10(B) shows an image display device as a comparative example, and FIGS. 10(C) and 10(D) show other types of image display device according to the invention, respectively.

In the example shown in FIG. 10(B), a movable body 121 provided so that it can be drawn out of and inserted into the case 11 configures a single unit with the optical engine portion 15 and the control portion 81 which are accommodated in the same case. Since the movable body 121 is only drawn and inserted, the projection angle of the laser beam cannot be adjusted vertically. Therefore, when the portable information processing apparatus is placed on a desk, the laser beam is blocked by the device-mounted surface of the desk, so the bottom portion of the image is missing on the screen. Hence, the image cannot be properly projected on the screen.

In the example shown in FIG. 10(C), a movable body 122 provided so that it can be drawn out of and inserted into the case 11 includes a first unit 123 and a second unit 124 supporting the first unit 123 to be able to rotate in the vertical direction. The first unit 123 accommodates the optical engine portion 15 and the control portion 81. In this configuration, by adjusting the projection angle of the laser beam up and down, it is possible to avoid the state where the bottom portion of the image is missing on the screen since the laser beam is blocked by the device-mounted surface of the desk.

However, in such a configuration, since the optical engine portion 15 and the control portion 81 are provided in the first unit 123, the weight of the first unit 123 increases. Moreover, since it is necessary to improve the solidity of the case 41 (refer to FIG. 2 too) in order to maintain the close positional relationship between respective portions, the weight of the optical engine portion 15 becomes considerable. However, because the projection optical system 28 in the optical engine portion 15 is provided at the end portion of the side opposite to a hinge portion 125, the optical engine portion 15 is disposed at a position distant from the hinge portion 125; therefore, a large load is applied on the hinge portion 125. As a result, it is necessary to enhance the strength of the hinge portion 125, and this leads to an increase in production costs.

In the example shown in FIG. 10(D), a movable body 126 that can be drawn out of and inserted into the case 11 includes a first unit 127 and a second unit 128 supporting the first unit 127 to be able to rotate in the vertical direction. The optical engine portion 15 is provided in the first unit 127, and the control portion 81 is provides in the case 11. In this configuration, since the control portion 81 is not provided in the first unit 127, it is possible to lighten the first unit 127; therefore, the load applied on a hinge portion 129 is reduced.

However, in this configuration, the number of wires (signal wire and power-supply wire) connecting the movable body to the control portion 81 increases. Therefore, a resistance caused when a interconnection cable 130 is transformed by bending according to the operation of drawing and inserting the movable body 126 becomes great, so there is a concern that the smooth operation of drawing and inserting the movable body 126 will be hindered.

Figure 11:
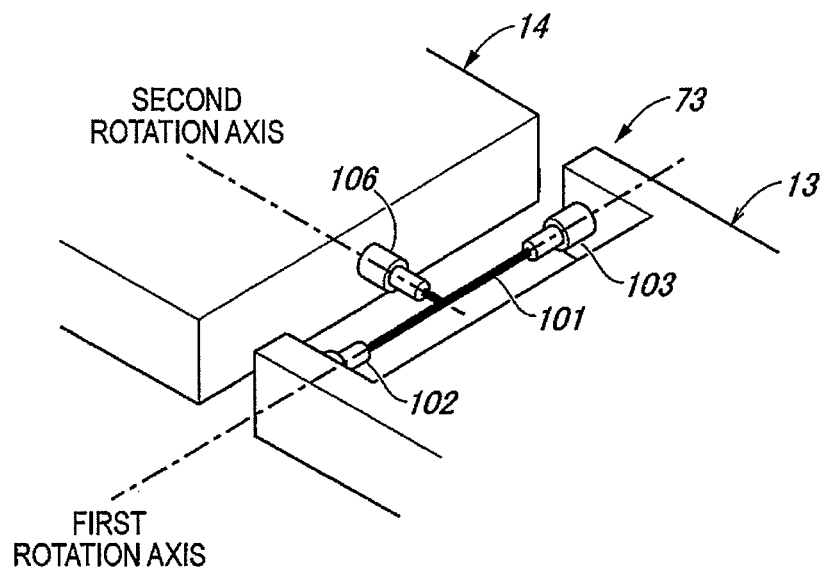
FIG. 11(A) is a first schematic perspective view showing an example of a hinge portion.
FIG. 11(B) is a second schematic perspective view showing the example of the hinge portion.
Figure 11:
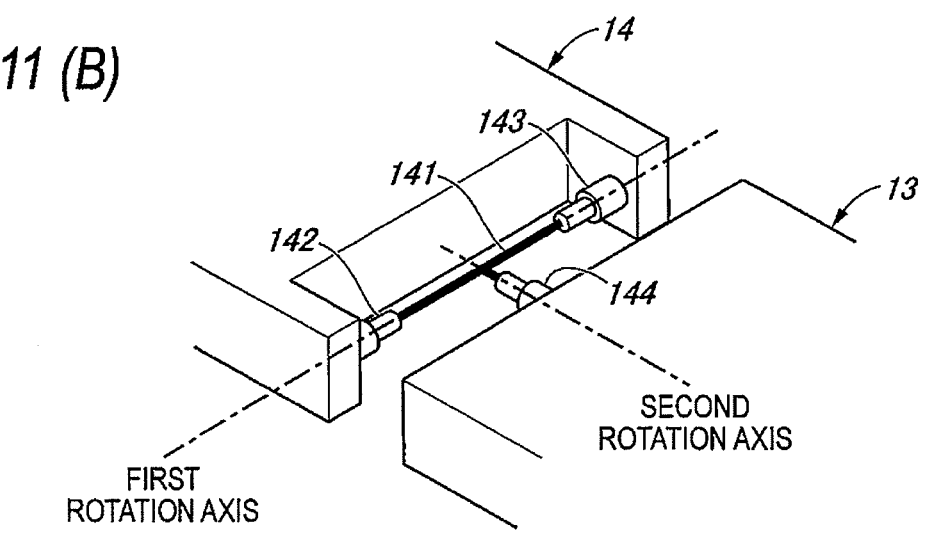

FIG. 11 is a schematic perspective view showing an example of a hinge portion. FIG. 11(A) shows the hinge portion 73 according to the embodiment, and FIG. 11(B) shows another type of a hinge portion, respectively.

In the hinge portion 73 according to the embodiment shown in FIG. 11(A), the connecting member 101 is connected through the second axial member 106 which becomes the second rotation axis with respect to the control unit 14, and through the first axial members 102 and 103 which become the first rotation axis with respect to the optical engine unit 13.

In this configuration, when the rotation of the optical engine unit 13 is adjusted, first, the optical engine unit 13 and the connecting member 101 may be rotated around the second rotation axis with respect to the control unit 14 to place the optical engine unit 13 horizontally, whereby the slanting of the image on the screen may be corrected. Thereafter, the optical engine unit 13 may be rotated around the first rotation axis with respect to the connecting member 101, and the projection angle of the laser beam with respect to the screen may be adjusted in the vertical direction.

Meanwhile, in the example shown in FIG. 11(B), a connecting member 141 is connected through first axial members 142 and 143 that become a first rotation axis with respect to the control unit 14, and through a second axial member 144 that becomes a second rotation axis with respect to the optical engine unit 13.

In this configuration, it is possible to correct the slanting of the image on the screen by rotating the optical engine unit 13 around the second rotation axis, but the first rotation axis cannot be adjusted in the horizontal direction. Accordingly, when the optical engine unit 13 is rotated around the first rotation axis, the image moves on the screen while being slanted. As a result, it is very cumbersome to properly display the image in a required position on the screen without causing the slanting of the image.

In addition, in the example, the hinge portion has the two orthogonal axes structure in which the first unit (optical engine unit 13) is rotated in two directions including the direction around the first rotation axis and the second rotation axis. However, the hinge portion may have a three orthogonal axes structure in which the first unit is also rotated around the direction orthogonal to the first rotation axis and the second rotation axis, that is, around the third rotation axis of the vertical direction, in addition to the first and the second rotation axes. In this configuration, as shown in FIG. 1, it is not necessary to make the lateral surface of the portable information processing apparatus 2 face the screen S, and the positional relationship between the portable information processing apparatus 2 and the screen S is not restricted. Therefore, it is possible to further improve the convenience.

Further, herein, the example has been given in which the image display device 1 according to the invention is built into the portable information processing apparatus 2. However, the image display device 1 can also be built into other portable types of information terminal devices.

Also, in the example, the configuration in which the image display device 1 according to the invention is accommodated in the accommodation space of the portable information processing apparatus 2 in a manner in which the image display device 1 can be replaced with an optical disc apparatus is shown. However, the image display device 1 can also be accommodated in an electronic apparatus such as a portable information processing apparatus in a manner in which the image display device cannot be replaced with another apparatus such as an optical disc apparatus.

The image display device according to the invention has an effect of preventing a image from being displayed on a screen in a slanted state when an electronic apparatus including the built-in image display device is used while being placed on a desk. The image display device according to the invention is useful as an image display device using a semiconductor laser for a light source, and particularly, as an image display device built into an electronic apparatus such as a portable information processing apparatus.

This application claims the benefit of Japanese Patent application No. 2010-232210 filed on Oct. 15, 2010 and Japanese Patent application No. 2010-232211 filed on Oct. 15, 2010, the entire contents of which are incorporated herein by reference.

What is claimed is:

1. An image display device built into an electronic apparatus, the image display device comprising:
a laser beam source unit emitting laser beams of respective colors;
a light modulation element modulating the laser beams emitted from the laser beam source unit based on video signals;
a projection optical system projecting the modulated laser beams formed by the light modulation element on a screen;
a control portion controlling the laser beam source unit and the light modulation element; and
a movable body provided to be drawn out of and inserted into a case of the electronic apparatus,
wherein the movable body includes at least a first unit having the projection optical system, and a second unit rotatably supporting the first unit through a hinge portion, and
wherein the hinge portion has a two-axis structure and rotates the first unit around a first rotation axis in a direction in which the projection angle of the laser beams to the screen changes vertically and around a second rotation axis in a direction in which the slanting of the images on the screen is corrected.

2. The image display device according to claim 1, wherein the laser beam source unit and the light modulation element are provided in the first unit together with the projection optical system, and
the control portion is provided in the second unit or separately provided in both sides including the second unit and the case of the electronic apparatus.

3. The image display device according to claim 1, wherein the electronic apparatus is a portable information processing apparatus and made to be accommodated in an accommodation space formed in the case of the portable information processing apparatus so that the electronic apparatus can be replaced with an optical disc apparatus.

4. An image display device built into an electronic apparatus, the image display device comprising:
a laser beam source unit emitting laser beams of respective colors;
a light modulation element modulating the laser beams emitted from the laser beam source unit based on video signals;
a projection optical system projecting the modulated laser beams formed by the light modulation element on a screen;
a control portion controlling the laser beam source unit and the light modulation element; and
a movable body provided to be drawn out of and inserted into a case of the electronic apparatus,
wherein the movable body includes at least a first unit having the projection optical system, and a second unit rotatably supporting the first unit through a hinge portion, and
wherein the hinge portion includes a connecting member extending along the first rotation axis, and wherein a case of either the first unit or the second unit connected to the connecting member through axial members as the second rotation axis and the connecting member are respectively provided with opening portions through which an interconnection cable connecting the first unit and the second unit is inserted, and these opening portions are formed so that the insertion area of the cable is secured all the time in a rotation range of the connecting member around the second rotation axis.

5. The image display device according to claim 4, wherein the hinge portion rotates the first unit in a direction where the slanting of images on the screen is corrected.

6. The image display device according to claim 4, wherein the electronic apparatus is a portable information processing apparatus and made to be accommodated in an accommodation space formed in the case of the electronic apparatus so that the electronic apparatus can be replaced with an optical disc apparatus.

* * * * *